United States Patent [19]

Fawcett

[11] Patent Number: 5,085,349
[45] Date of Patent: Feb. 4, 1992

[54] RESILIENT VALVE AND DISPENSING SYSTEM FOR BICYCLISTS

[76] Inventor: Roger R. Fawcett, P.O. Box 4972, Odessa, Tex. 79760

[21] Appl. No.: 477,708

[22] Filed: Feb. 8, 1990

[51] Int. Cl.$^5$ ............................................. A45F 3/00
[52] U.S. Cl. ................................. 222/175; 222/490; 224/35; 251/342
[58] Field of Search ............... 222/490, 494, 175, 107; 224/148, 35; 251/4, 342; 137/846; 606/234, 235, 236; 604/77, 246

[56] References Cited

U.S. PATENT DOCUMENTS

| | | | |
|---|---|---|---|
| 581,767 | 5/1897 | Powers | 224/148 |
| 2,219,604 | 10/1940 | Trotter | 137/846 |
| 3,822,720 | 7/1974 | Souza | 137/846 |
| 4,090,650 | 5/1978 | Gotta | 224/148 |
| 4,095,812 | 6/1978 | Rowe | 224/35 |
| 4,629,098 | 12/1986 | Eger | 222/175 |
| 4,739,905 | 5/1988 | Nelson | 222/175 |
| 4,776,495 | 10/1988 | Vignot | 222/494 |
| 4,852,781 | 8/1989 | Shurnick et al. | 224/148 |
| 4,941,598 | 7/1990 | Lambelet, Jr. et al. | 222/490 |
| 4,948,023 | 8/1990 | Tripp | 222/175 |

Primary Examiner—Michael S. Huppert
Assistant Examiner—Anthoula Pomrening
Attorney, Agent, or Firm—Marcus L. Bates

[57] ABSTRACT

A unitary resilient valve device that can be used in a system for delivering liquid from a container to a person'mouth. The valve is in the form of an elongated body member that forms a hollow structure having an open inlet end opposed to a closed outlet end. A fluid supply chamber is formed between the inlet and outlet ends, and the open end is connected to the end of a length of tubing in order to supply fluid flow to the supply chamber, while the closed end provides a closure member that normally precludes fluid flow therethrough. The body member can be deformed to move the valve into an opened configuration to enable fluid flow to occur therethrough. A slit is formed in the closure member. The slit extends through the end wall and communicates the supply chamber with ambient whenever the slit is defomed into the opened position. The slit is arranged laterally respective to the elongated hollow body and is biased into a closed position by the fluid pressure effected on the closure member together with the memory of the resilient body. A liquid supply is connected to the tubing and provides a fluid source for the supply chamber and when the valve body is deformed to open the slit, fluid flows from the supply chamber and away from the valve where the contents of the chamber are made available to be ingested by the person.

13 Claims, 2 Drawing Sheets

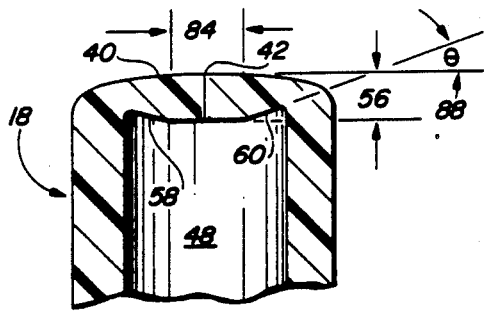
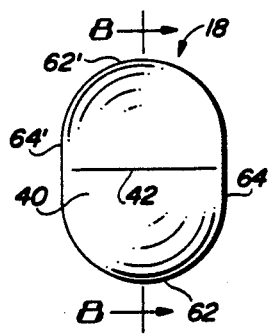
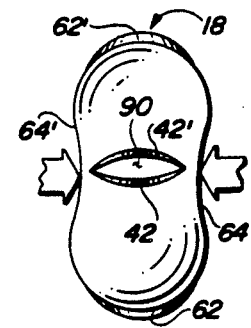
FIG-8   FIG-9   FIG-10
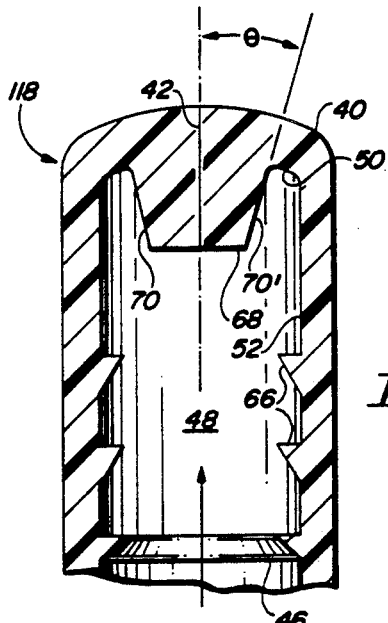
FIG-11
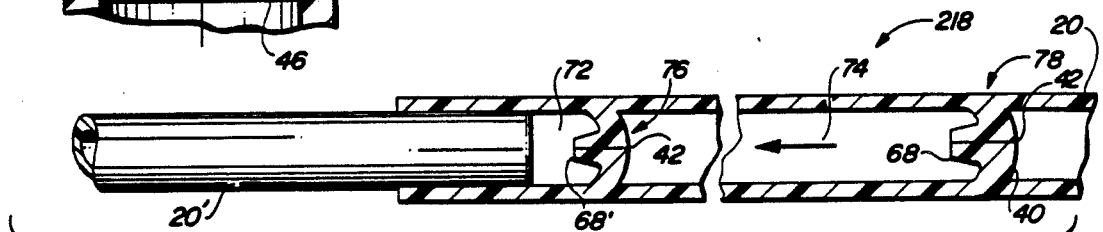
FIG-12
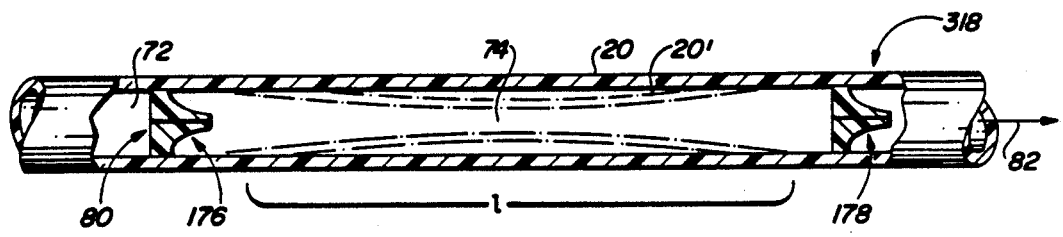
FIG-13

1

RESILIENT VALVE AND DISPENSING SYSTEM FOR BICYCLISTS

BACKGROUND OF THE INVENTION

The rate at which body liquids are aspirated into the atmosphere increases with ambient temperature, humidity, wind velocity, wearing apparel, and power output of the body. Under extreme circumstances, the rate at which moisture is translocated from the body into the atmosphere is alarming and for this reason it is advantageous that liquids be ingested at substantially the same rate at which they are dissipated from the body in order to maintain a feeling of well being and to be able to properly function both mentally and physically. Hence, the water content of our body is extremely important and must be maintained at a suitable level in order to enjoy good health and to avoid the dangers of heat prostration.

Bicyclists, long distance runners, and other athletes are examples of those who require that water or nutritional liquid be continuously replaced while exercising. This feat is difficult to achieve because of the complexities involved in simultaneously drinking from a container while pedaling a bicycle, for example. Apparatus by which this difficult task can be achieved is one of the subjects of the present invention.

It would be desirable to have made available a resilient, unitary valve device for oral use in order to avoid the possibility of any co-acting parts becoming loose or broken and being ingested into one's mouth. This is especially important for a bicyclist or a runner who may be hyperventilating while holding the valve device within their mouth. The loose parts of the valve could be ingested into the lungs, or passageways associated with the lungs, as well as the stomach or the passageways leading to the stomach, and could conceivably cause strangulation of such a person.

The present invention provides a valve device of unitary construction that avoids the above drawbacks and provides the desired described benefits. Moreover, the valve of the present invention can be arranged to provide a simple, unitary pump system that can be manipulated by the mouth or by one's hand to move fluid from one location to another location.

SUMMARY OF THE INVENTION

This invention defines a novel valve device which is in the form of an elongated body member that provides a hollow structure having an open inlet end opposed to a closed outlet end. A fluid supply chamber is formed between the inlet and outlet ends. The open inlet end is connected to a length of tubing to supply fluid flow from a suitable container to the supply chamber, while the closed outlet end provides a deformable closure member that normally precludes fluid flow therethrough, and which can be compressed or deformed into an opened configuration to enable fluid flow to occur therethrough.

More specifically, this invention relates to a resilient, unitary valve apparatus of a size and configuration to be comfortably received within a person's mouth for use in a system for delivering liquid from a container to the valve apparatus located in a person's mouth. The novel valve is in the form of an elongated body member that forms a hollow structure having an open inlet end opposed to a closed outlet end, with there being a fluid supply chamber formed between the inlet and outlet ends. The open inlet end can be connected to a length of tubing to supply fluid flow from the container to the supply chamber, while the closed outlet end provides a deformable closure member that normally precludes fluid flow therethrough, and which can be clamped between the teeth and deformed into an opened configuration to enable fluid flow to occur therethrough and into a person's mouth.

In one form of the invention, a slit is formed in the deformable closure member. The slit extends through the end wall and thereby communicates the supply chamber with ambient whenever the slit is deformed into an oblated or crescent shaped opened position. The slit is arranged laterally respective to the elongated hollow body and is normally biased into a closed position due to the shape of the end wall together with the memory of the resilient body.

The container provides a liquid supply and is connected to the tubing end opposed to the valve such that the tubing and container provide a fluid source for the supply chamber of the valve. When the valve body is deformed to open the slit, fluid flows from the supply chamber and through the valve where the contents of the chamber are made available to be ingested by a person who may be holding the valve in his mouth.

The end wall of the valve that forms the resilient closure member has an outwardly curved exterior wall and opposed inwardly curved inner walls that form the closure member or end of the chamber. Hence the inner wall surface of the closure member slopes or curves inwardly in an upstream direction in opposition to the outer wall surface. The slit is formed to intersect the central longitudinal axis of the valve and within the central area defined by the inwardly sloped walls of the closure member. The angle formed between the inwardly sloped walls is between 10 and 120 degrees, with the slit bisecting the angle, such that the angle between the slit and a sloped wall is 5 to 60 degrees.

The preferred form of the invention is embodied in a resilient body which is oblated in lateral cross-sectional configuration, with said slit being orientated to lay along the minimum diameter thereof. The outer wall slopes about 15 degrees respective to a lateral plane formed through said resilient body, and the end wall is reduced in thickness at the outer edge thereof that joins the body sidewall. Anchor means are formed on the interior of the body for engaging the outer surface of the tubing with increased friction.

The resilient, plastic material from which the valve body is fabricated has a memory that normally forces the opposed abutting surfaces of the slit together and this action augments the closing action derived from the configuration of the inner wall surfaces and thereby precludes flow therethrough. The geometry of the closure member and the geometry of the valve body along with the material of construction therefore determines the hydrostatic head required for leakage to occur through the slit.

The valve body is placed in one's mouth so that it can be deformed by one's jaws and thereby open the slit in proportion to the force exerted thereagainst and thereby enable flow to occur from the supply chamber to ambient. When the valve is held in one's mouth and clamped between the teeth, and the supply chamber is connected to an elevated source of liquid, the liquid can be metered into one's mouth whenever desired by forcing the sidewalls of the valve body towards one another thereby opening the slit and allowing liquid to flow into one's mouth.

The oblated cross-sectional configuration of the valve body and the orientation of the slit enables the apparatus to be held in proper position in one's mouth and thereby meter fluid into the body with very little conscious effort.

A primary object of the present invention is the provision of a unitary resilient valve apparatus that precludes flow therethrough until the sidewalls thereof are deformed whereupon flow can occur through a closure member thereof.

Another object of the present invention is the provision of a resilient valve device adapted to be placed into one's mouth and clamped between the teeth to thereby force the sidewalls of the device towards one another and open a resilient closure member thereof through which fluid can flow into a person's mouth.

A further object of the present invention is the provision of a supply of liquid carried on one's body and connected to a unitary resilient valve device that can be conveniently and comfortably held within one's mouth and when the valve device is clamped between the teeth, liquid flows from the supply into the person's mouth in proportion to the force exerted against the opposed sidewalls of the valve device.

Another and still further object of the present invention is to provide a unitary resilient valve device having an end wall that connects a supply chamber to ambient and a slit formed through the end wall laterally respective to the longitudinal axis of the supply chamber, with the end wall having a configuration whereby the force exerted against the exterior walls of the valve device determines the rate of flow through the slit.

An additional object of this invention is to provide a unitary resilient valve device having a slit formed in an end wall thereof wherein the pressure exerted against the opposed sidewalls of the valve device determines the deformation of the slit and the flow rate therethrough.

Another object of this invention is the provision of a valve in the form of an elongated body member that forms a hollow structure having an open inlet end opposed to a closed outlet end, with there being a fluid supply chamber formed between the inlet and outlet ends, and the open end is connected to the end of a length of tubing in order to supply fluid flow to the supply chamber, while the closed end is provided with a closure member that normally precludes fluid flow therethrough and which can be deformed by the mouth into an opened configuration to enable fluid flow to occur therethrough.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 8 is a fragmentary, longitudinal, cross-sectional view taken along line 8—8 of FIG. 9;

FIG. 9 is an end view of the apparatus disclosed in FIGS. 6 and 8, looking in the direction indicated by the arrows at numeral 9—9;

FIG. 10 is another end view of the foregoing valve device looking in the direction of the arrows indicated by numeral 9—9 of FIG. 6, with the valve being distorted into the opened configuration;

FIG. 11 is an enlarged, longitudinal, cross-sectional, representation of an alternate embodiment of the valve device seen in FIGS. 6–10;

FIG. 12 is a longitudinal, part cross-sectional view of an alternate embodiment of the present invention; and, FIG. 13 sets forth a longitudinal, part cross-sectional view of an alternate embodiment of the apparatus disclosed in FIG. 12.

DETAILED DESCRIPTION OF THE PREFERRED EMBODIMENT

Figure 1:
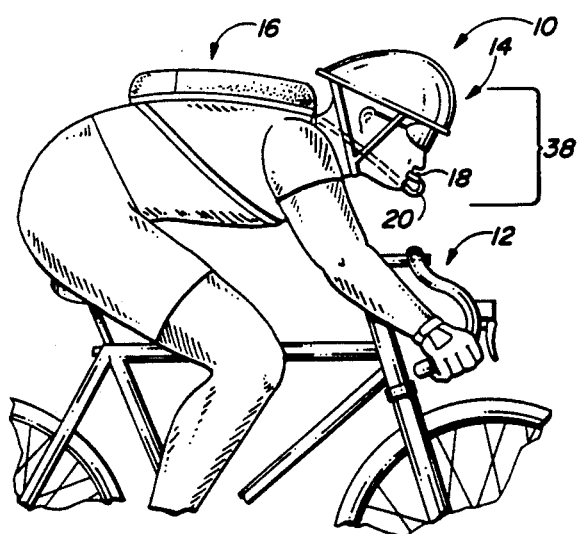
FIG. 1 is a broken, part diagrammatical, side elevational view of a bicyclist having the present invention associated therewith.
Figure 2:
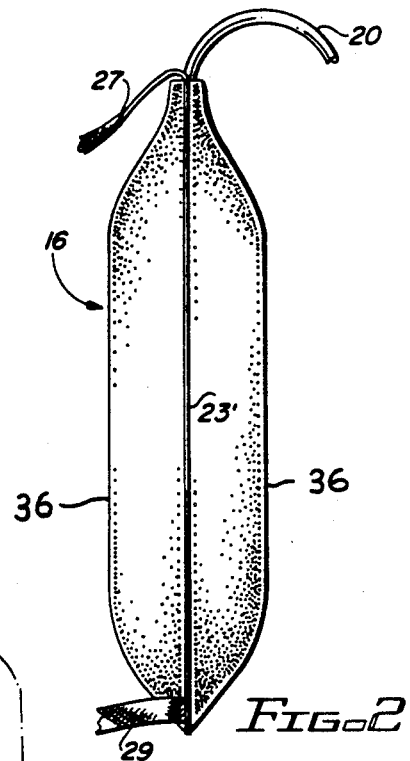
FIG. 2 is an enlarged, broken, side elevational view of part of the apparatus disclosed in FIG. 1.

In FIG. 1 of the drawings, numeral 10 broadly indicates the present invention. A bicycle 12 is being ridden by a rider or bicyclist 14. The bicyclist has a pack 16, made in accordance with the present invention, attached to his back. Numeral 18 indicates a valve device that is held in the bicyclist's mouth, and a flow conduit in the form of a tube 20 leads from the pack 16 to the valve 18.

Figure 3:
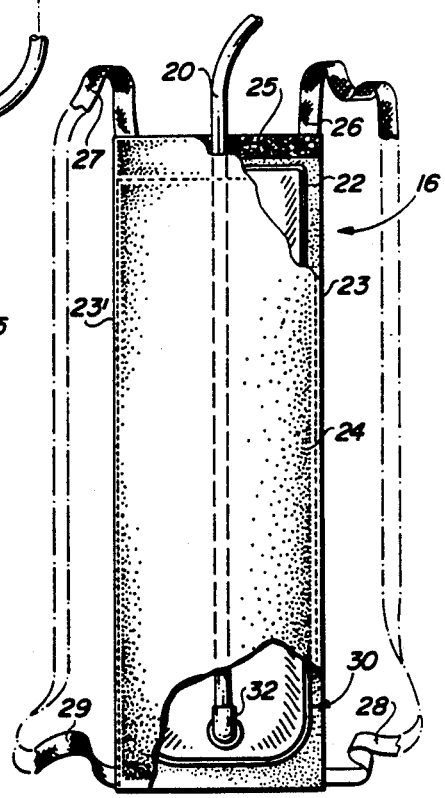
FIG. 3 is a top, part cross-sectional view of the apparatus disclosed in FIG. 2, with some parts being broken away therefrom in order to disclose the interior thereof.

As generally seen in FIGS. 1–5, and particularly in FIG. 3, the pack 16 has an interior 22 formed by sheets of material having foam-like insulation on the interior thereof and fabric-like material on the exterior. The sheets of material are stitched together about the periphery thereof as seen at 23, 23'. This provides an outer surface 24 having a fabric-like finish, with the foam-like insulation material being arranged on the inner surface of the pack.

The pack 16 is open at the top and includes a fastener means 25, as for example, velcro fastener material (TM). Straps 26, 27 are attached to and extend from opposed vertical sides of the pack 16, while straps 28, 29 are attached to an extend from the lower horizonal edge portion of the pack 16.

Figure 4:
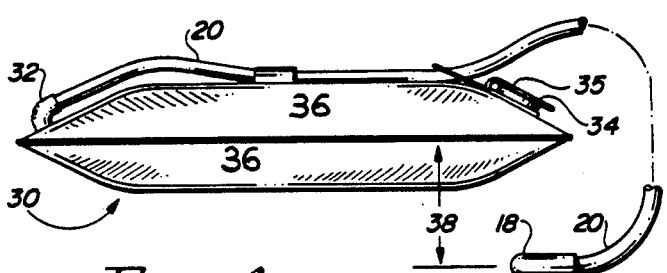
FIG. 4 is a side elevational view of part of the apparatus disclosed in FIG. 3.
Figure 5:
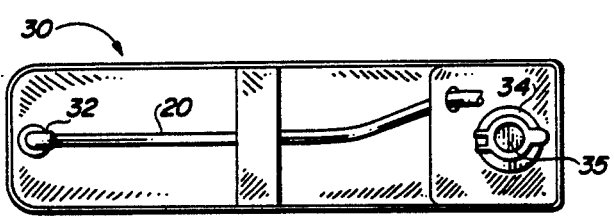
FIG. 5 is a top, plan view of the apparatus disclosed in FIG. 4.
Figure 6:
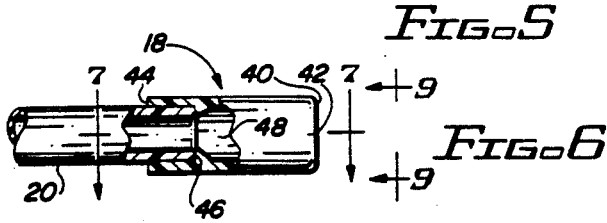
FIG. 6 is an enlarged, fragmentary, part cross-sectional, representation of part of the apparatus disclosed in some of the foregoing figures, and showing a valve device made in accordance with the present invention, with some parts being broken away therefrom.

Numeral 30 of FIGS. 3, 4 and 5 indicates a collapsible water containing, flexible, plastic bag having an outlet 32 that is attached to the end of the before mentioned tube 20.

As best seen in FIGS. 4 and 5, together with other figures of the drawings, the flexible plastic bag 30 has an outlet neck 34 closed by cap member 35. The sidewalls 36 of the flexible plastic bag 30 preferably are made of clear plastic material. Numeral 38 of FIGS. 1 and 4 indicates the hydrostatic head measured between the valve device 18 and the flexible plastic water bag 30.

In FIGS. 6-11, the unitary resilient valve 18 is seen to have an end wall or closure member 40 that forms a terminal or outlet end of the valve 18. The outlet end is closed and the closure member is seen to have a slit 42 formed therethrough. The slit is normally closed. Numeral 44 indicates the inlet end of the valve device 18, which is opposed to the outlet end wall 40 thereof. A circumferentially extending tubing stop 46 is formed near the entrance leading into a supply chamber 48. The supply chamber 48 is formed by the inner wall 50 of the before mentioned resilient end wall 40 and the circumferentially extending interior resilient wall 52. Accordingly, the slit 42 extends longitudinally through the end wall 40 and extends a lateral length indicated by numerals 54, 54', and has a longitudinal dimension determined by the spacing of the opposed wall members 40, 50.

Figure 7:
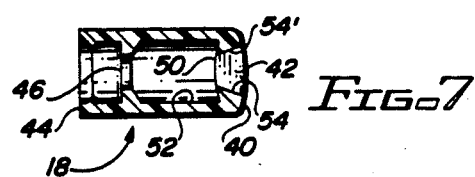
FIG. 7 is a longitudinal, cross-sectional view taken along lines 7—7 of FIG. 6.

In FIGS. 7, 8 and 9, end wall 40 is seen to have the outer surface thereof curved or sloped away from end wall 40 on the inner wall 50 thereof, the resultant structure being lens shaped. As seen in FIG. 8, the thickness of the end wall 40 is indicated by numeral 56. The inner wall 50 of the valve slopes or converges in an upstream direction as indicated by numerals 58 and 60 and thereby form the lens shaped end wall. The walls 58 and 60 meet at slit 42.

In FIGS. 9 and 10, the valve is seen to be oblated and includes opposed small sides 62, 62' and opposed large sides 64, 64'. The space between walls 62, 62' is large while the space between walls 64, 64' is small.

In the embodiment 118 seen in FIG. 11, circumferentially extending tubing holder 66 engages the outer surface of tube 20 and removable anchors the plastic, flexible tube 20 within the interior of the hollow resilient valve device 118. The innermost wall surface 68 extends upstream a considerable distance from the inner wall surface 50 thereof, with the wall surfaces 50, 68 being interconnected by the inwardly directed walls 70, 70', each of which are arranged at the angle $\theta$ respective to a perpendicular plane passing through the slit 42, with the angle $\theta$ being in a range of 10-80 degrees. Hence, the included angle between wall surfaces 70, 70' is 20-160 degrees, and this embodiment of the invention therefore can withstand a greater hydrostatic head as compared to the embodiment disclosed in FIG. 8 without leakage occurring thereacross.

In an alternate embodiment illustrated in FIG. 12, the unitary resilient valve structure of this invention provides a pump 218. The pump device has an upstream chamber 72 separated from a downstream chamber 74 by upstream closure member 76. The closure member 76 includes the before mentioned slit 42 formed therein. The downstream closure member 78 forms the terminal end and outlet of the pump apparatus 218. The valve members or closure members 76 and 78 can be made in the manner of the valve device 18 seen in the embodiment of FIGS. 6-11, if desired.

FIG. 13 discloses a pump apparatus 318 having a pair of valve apparatus that includes an upstream closure member 176 and a downstream closure member 178, with there being a chamber 74 formed therebetween, and a chamber 72 formed upstream of chamber 74. Numerals 80 and 82 indicate the direction of flow through the main housing which can be similar to the length of tube 20. Numeral 20' indicates the cyclic collapsing of the tubular housing as a pumping action is carried out with the apparatus of either of FIGS. 12 or 13.

The oblated configuration of the valve device 18 that forms the mouthpiece, and the relative dimensions of the end wall at 40, 56, 58, and 60 are selected for achieving optimum utility from the resilient valve 18. The hydrostatic head 38 effects a pressure against walls 58, 60 to force the walls in a downstream direction. A small angle $\theta$, together with a small thickness 56, will provide control over a specific value of the hydrostatic head 38 and at the same time permit opening of the slit 42 with a comfortable bite. The term "small angle $\theta$" is a value equal or greater than 10 degrees; the term "small thickness 56" is a value equal or greater than 0.075 inches.

The oblated configuration of the mouthpiece or valve device 18 enhances proper placement between the teeth and orients the slit as seen in FIG. 10 wherein the teeth bear laterally against the outer sidewalls of the valve device as illustrated by the large arrows representing the force required to open slit 42 into a flow passageway 90. The size of opening 90 is proportional to the force of the jaws bearing thereagainst.

A high or large angle $\theta$ and a large thickness of the end wall withstands a greater hydrostatic head and therefore offers greater resistance to flow through the slit. The maximum thickness of the end wall and the maximum angle $\theta$ has been found to be 80 degrees and 0.35 inches thick. This configuration requires a hydrostatic head of 8 feet to upset the closed slit into a passageway 90 and allow leakage therethrough.

The valve device of the present invention finds utility for purposes other than for use as a mouthpeice, and therefore constitutes an improvement over other prior art valve devices and can be advantageously used wherever the valve device per se is needed. The valve device of this invention can be connected to any suitable fluid supply and a pressure differential effected across the valve device to thereby cause flow to occur therethrough whenever the endwall thereof is placed in compression to open the slit in the before described manner discussed in conjunction with FIGS. 9 and 10. Pressure differential across the valve device can be effected by hydrostatic head as shown in FIG. 1, for example; downstream suction; or any other known expedient.

When the small outer wall part 64, 64' of the mouthpiece is clamped between the teeth, the slit 42 of valve 18 is upset from the closed position, as seen in FIG. 9, into the opened position of FIG. 10. This allows liquid to flow through tube 20, into supply chamber 48, and through outlet or slit 42, where it can be ingested by the athlete. Hence, the rate of flow through slit 42 can be throttled by the clamping pressure exerted on opposed sidewalls of the valve device by one's jaws. FIGS. 1 and 3 disclose the preferred manner of arranging the flexible plastic water bag 30 respective to the pack 16 and the bicyclist 14.

Accordingly, the present invention provides a unique water, or nutritional liquid delivery system 10, for athletes and particularly for bicyclists and runners. The novel system comprises a collapsible plastic bag 30 that is carried inside of a pocket or a small pack 16 located between the shoulders on the athlete's back. This enables one's hands to remain on the bicycle steering mechanism most of the time, and frees the hands from the task of supplying nourishment to the body.

As particularly illustrated in FIG. 3, the system 10 has a flexible plastic tube 20 that extends from the bottom of the water bag at outlet 32, and through the top of the pack 16 through fastener 25. Where deemed desirable, either location can be provided with a suitable quick connector for fast loading of new or replacement water bags. Located at the end of the flexible plastic tube 20 that extends down to the bicyclist's or runner's mouth, is the before described special mouthpiece or valve 18 which is of unusual construction and which, when bitten down upon, opens to release the liquid stored in flexible bag 30 to the rider. When the mouthpiece is released, the configuration of the inner walls 58,60 or 70,70' together with the memory of the resilient material causes the illustrated slit 42 formed in the end wall 40 of the valve automatically to shut off the flow of liquid to the rider.

FIGS. 12 and 13 disclose alternate embodiments 218 and 318 of the valve device 18. In FIGS. 12 and 13, chambers 72, 74 are spaced from one another by valve 76. The series connected valves 76, 78 provide a unique pump which is actuated as shown in FIG. 13 at 20, 20'. This allows fluid to be transferred from a location below the valve device so that no hydrostatic head 38 is required for transferring liquid. Thus, when the apparatus is squeezed or is bitten down upon, the liquid is forced from the isolated chamber 74 of the valve 218 or 318, thereby allowing the liquid to pass from chamber 74, through the slit 42, and out the end of the valve. When pressure on the sidewalls of the valve is released, the memory of the plastic returns the slit to the closed position of FIGS. 8 or 9 and the memory of the chamber sidewalls forms a reduced pressure therein to suck fluid from a suitable supply.

The end view of valve devices 76 and 78 of FIG. 12 would be substantially identical to the valve device of FIGS. 9 and 10. The operation of the valve devices at 76, 78, 176 and 178 would be substantially identical to that set forth in conjunction with FIGS. 1 through 11.

I claim:

1. A system for delivering liquid from a container of fluid to a person's mouth comprising:

a unitary resilient valve of a size to be received within a person's mouth; said valve being an elongated hollow body member having an open inlet end opposed to an outlet end; means forming a fluid supply chamber within said body member that communicates with said inlet and outlet ends, means by which said open end is connected to one end of a length of tubing, and means connecting the other end of the length of tubing to a container of fluid to thereby supply fluid flow to the supply chamber;

a closure member at said outlet end providing means forming a normally closed slit in said closure member which extends therethrough and thereby communicates the supply chamber with ambient whenever the slit is deformed into an opened position, said slit is arranged laterally respective to the elongated hollow body and is biased into a closed position by the memory of the resilient body, and thereby precludes fluid flow therethrough and can be opened to enable fluid flow therethrough;

said closure member includes an outwardly curved outer wall and an inner chamber wall that slopes inwardly in an upstream direction in opposition to said outer wall; said slit is formed in the inwardly sloped wall; the slope of said inner chamber wall, together with the memory of the material from which the closure member is made, determines the hydrostatic head that must be effected upstream of the closure member for flow to occur through the slit when the valve is in the normally closed configuration;

whereby: a liquid supply, when placed in said container, provides a fluid source for said supply chamber; and, when said valve body member is deformed to open said slit, fluid flows from said supply chamber and flows away from the valve where the contents of the chamber are made available to be ingested by a person.

2. The system of claim 1 wherein the inwardly sloped wall forms an angle between 10 and 120 degrees, with the slit bisecting the angle.

3. The system of claim 2 wherein the resilient body is oblated in lateral cross-sectional configuration with said slit being orientated along the minimum diameter thereof.

4. The system of claim 3 wherein the outer wall slopes about 15 degrees respective to a lateral plane formed through said resilient body and the closure member at the outlet end is about 0.075 inch thick and reduces in thickness to about 0.010 inches at the outer edge thereof that joins the sidewall.

5. The system of claim 4 wherein anchor means are formed on the interior of the body for engaging the outer surface of the tubing with increased friction; and the elongated body is about one inch in length, 0.375 inch in minor diameter and 0.400 in major diameter.

6. A resilient unitary valve device for use in a system for delivering liquid from a container to a person's mouth; said valve device comprising a unitary resilient elongated body member that forms a hollow structure and includes an open inlet end opposed to a closed outlet end, means forming a fluid supply chamber within said body member between said inlet and outlet end, said open inlet end is adapted to be connected to an end of a length of tubing and thereby supply fluid flow to said supply chamber when the other end of the length of tubing is connected to receive liquid from a container; said closed end of said valve device is in the form of a closure member that normally precludes fluid flow therethrough when closed and which can be opened to enable fluid flow therethrough;

means forming a deformable slit which extends through said closure member and thereby communicates the supply chamber with ambient whenever the slit is deformed into the opened position, said slit is arranged laterally respective to said elongated hollow body and is normally biased into a closed position by the memory of said resilient body; said closure member has an outwardly curved outer wall surface and an inner chamber wall surface, said inner chamber wall surface slopes inwardly in an upstream direction in opposition to the outer wall; said slit is formed at a location where the inwardly sloped wall and the outwardly curved wall are spaced furthest apart; the slope of said inner chamber wall, together with the memory of the material from which the closure member is made, determines the hydrostatic head that must be effected upstream of the closure member for flow to occur through the slit when the valve device is in the normally closed configuration, whereby;

a liquid supply can be connected to a length of tubing to provide a fluid source for the supply chamber and when the valve body is deformed to open the slit, fluid flows from the supply chamber and through the valve where the contents of the chamber are made available to be ingested by a person.

7. The valve device of claim 6 wherein the inwardly sloped wall forms an angle between 10 and 120 degrees, with the slit bisecting the angle.

8. The valve device of claim 7 wherein the resilient body is oblated in lateral cross-sectional configuration with said slit being orientated along the minimum diameter thereof; and wherein a relatively large angle between the inwardly sloped walls requires a relatively large pressure differential across the valve device in order for leakage to occur therethrough.

9. The valve device of claim 8 wherein the outer wall slopes about 15 degrees respective to a lateral plane formed through said resilient body and the closure member at the outlet end is about 0.075 inch thick and reduces in thickness to about 0.010 inches at the outer edge thereof that joins the sidewall.

10. The valve device of claim 9 wherein anchor means are formed on the interior of the body for engaging the outer surface of the tubing with increased friction; and the elongated body is about one inch in length, 0.375 inch in minor diameter and 0.400 in major diameter.

11. A resilient, unitary valve device in the form of a mouthpiece for use in a system for delivering liquid from a container to a person's mouth; said mouthpiece is of a size to be received within a person's mouth, and which delivers liquid upon demand by clamping the mouthpiece between the jaws;

said mouthpiece is in the form of an elongated body member that is of a size to be received between the teeth of one's mouth, said body member forms a hollow structure; means forming an open inlet end opposed to a closed outlet end with the inlet end and closed outlet end being located at opposed ends of said body member; a fluid supply chamber within said body member between said inlet end and said closed outlet end, said open end can be connected to one end of a length of tubing and the other end of the tubing can be connected to a container of liquid to thereby supply fluid flow to said supply chamber; said closed outlet end is a closure member that normally precludes fluid flow therethrough;

means forming a slit in said closure member, said slit extends through the closure member and thereby communicates the supply chamber with ambient whenever the slit is deformed into the opened position, said slit is arranged laterally respective to the elongated hollow body member and is biased into a closed position by the memory of the resilient mouthpiece;

said closure member has a curved outer wall spaced from an inner chamber wall, said inner chamber wall slopes in opposition to the outer wall; said slit is formed within the area where the outer wall and the inwardly sloped wall are spaced furthest apart; whereby:

a liquid supply can be connected to a length of tubing to provide a fluid source for the supply chamber and when the mouthpiece is deformed between the teeth to open the slit, fluid flows from the supply into the mouthpiece and away from the slit whereupon the contents of the chamber is made available to be ingested by a person.

12. The valve device of claim 11 wherein the inwardly sloped wall forms an angle between 10 and 120 degrees, with the slit bisecting the angle; said resilient body is oblated in lateral cross-sectional configuration with said slit being orientated along the minimum diameter thereof.

13. The valve device of claim 12 wherein the outer wall slopes about 15 degrees respective to a lateral plane formed through said resilient body and the closure member at the outlet end has a center which is about 0.075 inch thick and reduces in thickness to about 0.010 inches at an outer edge thereof: anchor means are formed on the interior of the body for engaging the outer surface of the tubing with increased friction; and, the elongated body is about one inch in length, 0.375 inch in minor diameter and 0.400 in major diameter.

* * * * *